United States Patent
Shamasundar (10) Patent No.: US 11,790,785 B2
(45) Date of Patent: Oct. 17, 2023

(54) SYSTEM AND METHOD OF PRODUCING RELATIVE ACTIVE FLIGHT VOICE TAGS ON A GRAPHICAL DISPLAY UNIT

(71) Applicant: HONEYWELL INTERNATIONAL INC., Charlotte, NC (US)

(72) Inventor: Raghu Shamasundar, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 193 days.

(21) Appl. No.: 17/230,459

(22) Filed: Apr. 14, 2021

(65) Prior Publication Data
US 2022/0284821 A1 Sep. 8, 2022

(30) Foreign Application Priority Data
Mar. 2, 2021 (IN) .............................. 202111008686

(51) Int. Cl.
| | |
|---|---|
| G06F 3/0481 | (2022.01) |
| G08G 5/00 | (2006.01) |
| G06F 3/04817 | (2022.01) |
| G06F 3/04842 | (2022.01) |
| G10L 15/26 | (2006.01) |
| B64D 43/00 | (2006.01) |

(52) U.S. Cl.
CPC .......... G08G 5/0013 (2013.01); B64D 43/00 (2013.01); G06F 3/04817 (2013.01); G06F 3/04842 (2013.01); G08G 5/003 (2013.01); G08G 5/0021 (2013.01); G10L 15/26 (2013.01)

(58) Field of Classification Search
CPC .... G08G 5/0013; G08G 5/0021; G08G 5/003; B64D 43/00; G06F 3/04817; G06F 3/04842; G10L 15/26; G10L 2015/221; G01C 23/005
See application file for complete search history.

(56) References Cited

U.S. PATENT DOCUMENTS

| | | |
|---|---|---|
| 6,175,314 B1 | 1/2001 | Cobley |
| 6,639,522 B2 | 10/2003 | Derderian |
| 7,203,688 B2 | 4/2007 | Hopkins |
| (Continued) | | |

FOREIGN PATENT DOCUMENTS

CN 104899245 B 12/2018

*Primary Examiner* — Phuong H Nguyen
(74) *Attorney, Agent, or Firm* — Lorenz & Kopf LLP (57) ABSTRACT

A method on an aircraft for producing active voice tags on a flight path displayed on a graphical display unit is provided. The method comprises: identifying a specific instruction from a received message from ATC; determining, for the specific instruction a location relative to a planned flight path of the aircraft at which the specific instruction should be provided to flight crew; generating, for the specific instruction, a voice message configured to recite the specific instruction; associating with the voice message an actuatable graphical element that is actuatable to cause the voice message to be provided to flight crew; rendering the actuatable graphical element at or near the determined location on a depiction of the planned flight path that is displayed on the graphical display unit; and providing the voice message associated with the actuatable graphical element as an aural message responsive to actuation of the actuatable graphical element.

20 Claims, 5 Drawing Sheets (56) References Cited

U.S. PATENT DOCUMENTS

| | | | |
|---|---|---|---|
| 8,164,487 B1* | 4/2012 | Tsai | G08G 5/0039 455/412.2 |
| 9,666,178 B2 | 5/2017 | Loubiere et al. | |
| 10,275,427 B2 | 4/2019 | Saptharishi et al. | |
| 10,665,111 B2 | 5/2020 | Wang et al. | |
| 2005/0203676 A1 | 9/2005 | Sandell et al. | |
| 2015/0081292 A1* | 3/2015 | Populus | G08G 5/0095 704/235 |
| 2016/0161283 A1 | 6/2016 | Shamasundar et al. | |
| 2019/0118964 A1* | 4/2019 | Saptharishi | G06F 40/40 |
| 2020/0225831 A1 | 7/2020 | Saptharishi et al. | |

\* cited by examiner

SYSTEM AND METHOD OF PRODUCING RELATIVE ACTIVE FLIGHT VOICE TAGS ON A GRAPHICAL DISPLAY UNIT

CROSS REFERENCE TO RELATED APPLICATION

The present application claims the benefit of prior filed Indian Provisional Patent Application No. 202111008686 filed Mar. 2, 2021, which is hereby incorporated by reference herein in its entirety.

TECHNICAL FIELD

Embodiments of the subject matter described herein relate generally to systems and methods for receiving ATC instructions. More particularly, embodiments of the subject matter relate to systems and methods for selectively providing ATC instructions to flight crew members on demand.

BACKGROUND

During a flight, a lot of messages may be exchanged between aircraft flight crews and ATC. The messages may be related to traffic avoidance, weather avoidance, route enhancement, advisory/caution indications, or other matters.

Some messages may be related to future maneuvers. Flight crew members may not need to access the messages related to future maneuvers at the time they are conveyed, but at a time when the flight crew is prepared to plan for the maneuver. When provided in advance, the flight crew may need to record or memorize instructions in the ATC message for future use. This can increase flight crew workload.

Hence, it is desirable to provide systems and methods for extracting ATC instructions provided in advance and to allow flight crew to access the instructions on demand. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight deck system on an aircraft for producing active voice tags on a flight path displayed on a graphical display unit is disclosed. The flight deck system includes a controller configured to: identify a specific instruction from a received message (e.g., CPDLC or voice) from air traffic control (ATC); determine, for the specific instruction, based on aircraft state data and aircraft flight plan data, a location relative to a planned flight path of the aircraft at which the specific instruction should be provided to flight crew; generate, for the specific instruction, a voice message configured to recite the specific instruction; associate with the voice message an actuatable graphical element that is actuatable to cause the voice message to be provided to flight crew on the aircraft; render the actuatable graphical element at or near the determined location on a depiction of the planned flight path that is displayed on the graphical display unit; and cause the voice message associated with the actuatable graphical element to be provided as an aural message responsive to actuation of the actuatable graphical element.

A method on an aircraft for producing active voice tags on a flight path displayed on a graphical display unit is disclosed. The method includes: identifying a specific instruction from a received message (e.g., CPDLC or voice) from air traffic control (ATC); determining, for the specific instruction, based on aircraft state data and aircraft flight plan data, a location relative to a planned flight path of the aircraft at which the specific instruction should be provided to flight crew; generating, for the specific instruction, a voice message configured to recite the specific instruction; associating with the voice message an actuatable graphical element that is actuatable to cause the voice message to be provided to flight crew on the aircraft; rendering the actuatable graphical element at or near the determined location on a depiction of the planned flight path that is displayed on the graphical display unit; and providing the voice message associated with the actuatable graphical element as an aural message responsive to actuation of the actuatable graphical element.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for extracting ATC instructions from ATC messages provided in advance and to allow flight crew to access the instructions on demand. The apparatus, systems, techniques, and articles disclosed herein can provide voice tags that can be overlaid a graphical display of an active flight path. The voice tags contain instructions derived from ATC messages that can be dynamically updated based on aircraft state information. The voice tags can be manually actuated by flight crew or automatically actuated upon the aircraft reaching a predetermined location. Use of voice tags can reduce flight crew workload by allowing the flight crew to access ATC instructions when they are needed without having to memorize or record the instructions in advance.

Figure 1:
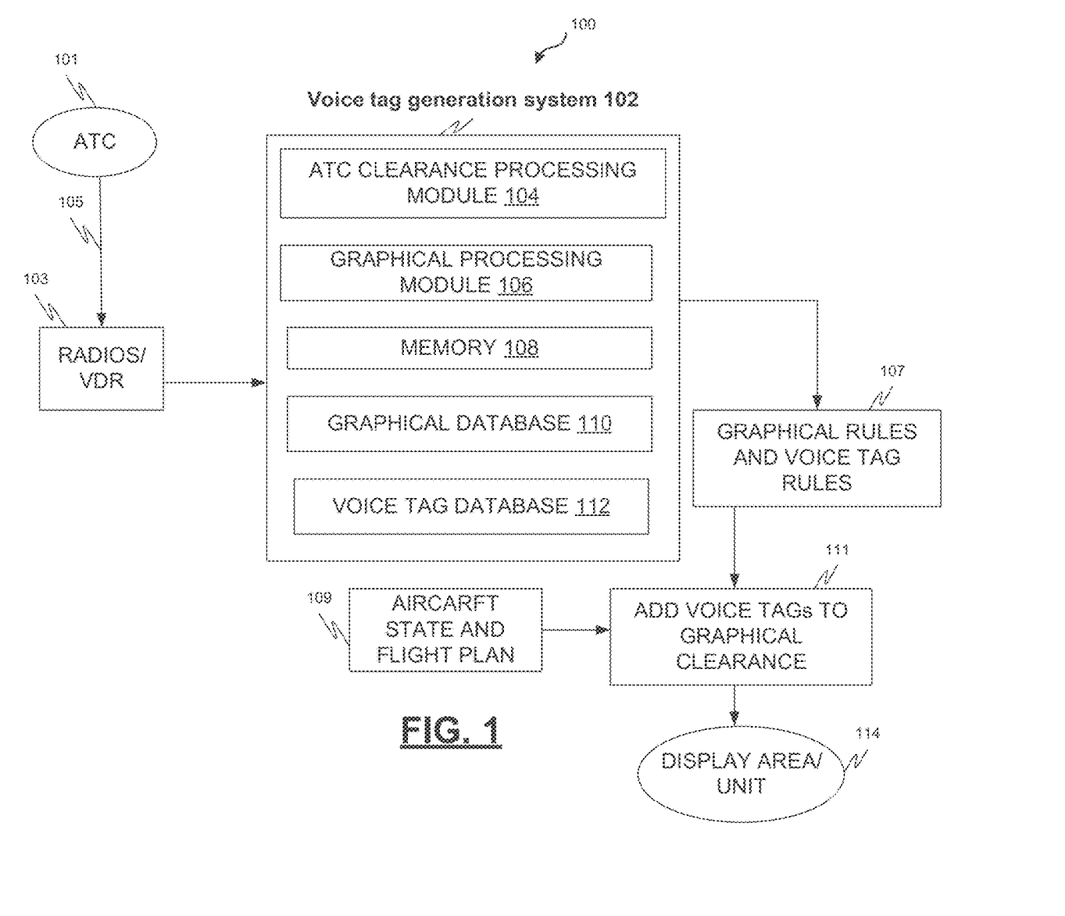
FIG. 1 is a block diagram depicting an example aircraft environment in which relative, active flight, voice tags may be generated for display on a graphic display device and for actuation and use to convey ATC instructions via an aural message upon actuation of a voice tag, in accordance with some embodiments.

FIG. 1 is a block diagram depicting an example aircraft environment 100 in which relative, active flight, voice tags may be generated for display on a graphic display device and for actuation and use to convey ATC instructions via an aural message upon actuation of a voice tag. The example environment 100 includes a voice tag generation system 102 that is configured to analyze ATC (air traffic control) instructions and generate therefrom relative voice tags with an associated graphical icon to be displayed on a graphical display of an active flight plan displayed on a cockpit display unit. The graphical icons when actuated (e.g., via selection of the icon from the graphical display unit or automatically when the aircraft reaches a predetermined location) cause their associated relative voice tag to present (e.g., play over a speaker system in the aircraft) an aural message that includes a fixed component and/or a relative component. The fixed component identifies a maneuver (e.g., course change, altitude change, speed change, etc.) to be performed per an ATC instruction, and the relative component identifies how far (e.g., distance or time) the aircraft will travel before performing the ATC mandated instruction.

The example voice tag generation system 102 includes an ATC clearance processing module 104 and a graphical processing module 106. Each of the ATC clearance processing module 104 and the graphical processing module 106 includes and is implemented by a processing component such as a controller (e.g., the same or separate controllers). The processing component includes at least one processor and a computer-readable storage device or media (e.g., memory 108) encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media (e.g., memory 108) may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example ATC clearance processing module 104 is configured to identify one or more specific instructions from a received message 105 (e.g., CPDLC or voice) from ATC 101 via an onboard radio or VDR 103. To identify a specific instruction from a received message 105 from ATC 101, the controller is configured to: separate the received message 105 into one or more message segments; for each message segment, correlate the message segment to an instruction type from a rules-set database 107, and retrieve instruction parameters (e.g., instruction execution location and maneuver parameter such as heading change, altitude change, speed change, and others) from the message segment; and generate a specific instruction from the instruction type based on the instruction parameters retrieved from its correlated message segment.

The example graphical processing module 106 is configured to determine, for the specific instruction, based on aircraft state data and aircraft flight plan data 109, a location relative to a planned flight path of the aircraft at which the specific instruction should be provided to flight crew; generate, for the specific instruction, a voice message configured to recite the specific instruction (e.g., including a fixed component and/or a relative component); associate with the voice message an actuatable graphical element (e.g., from graphical database 110) that is actuatable to cause the voice message to be provided to flight crew on the aircraft (operation 111); render the actuatable graphical element at or near the determined location on a depiction of the planned flight path that is displayed on the graphical display unit 114; and cause the voice message associated with the actuatable graphical element to be provided as an aural message responsive to actuation of the actuatable graphical element.

To determine the location relative to the planned flight path of the aircraft at which the specific instruction should be provided to flight crew, the example graphical processing module 106 is configured to: retrieve an instruction execution location from instruction parameters provided in the received message, and translate the instruction execution location to a location relative to the planned flight path of the aircraft.

To generate, for the specific instruction, a voice message configured to recite the specific instruction, the example graphical processing module 106 is configured to: identify a voice pattern to use for reciting the specific instruction (e.g., from a voice database 112); and translate the specific instruction into the voice message using the identified voice pattern.

To cause the voice message associated with the actuatable graphical element to be provided the example graphical processing module 106 is configured to: determine, based on aircraft state data and aircraft flight plan data 109, a projected time or distance in the future at which the specific instruction should be performed (e.g., the relative component); modify the voice message to include the projected time or distance in the future at which the specific instruction should be performed; and cause the modified voice message with the projected time or distance in the future at which the specific instruction should be performed to be provided as an aural message.

To cause the voice message associated with the actuatable graphical element to be provided, the example graphical processing module 106 may be further configured to cause the voice message to be provided as a textual message on a graphic display device.

In some example embodiments, the example graphical processing module 106 is further configured to cause the voice message associated with the actuatable graphical element to be automatically provided as an aural message and/or textual message when the controller determines that the location relative to the planned flight path of the aircraft at which the specific instruction should be provided to flight crew has been reached.

Figure 2:
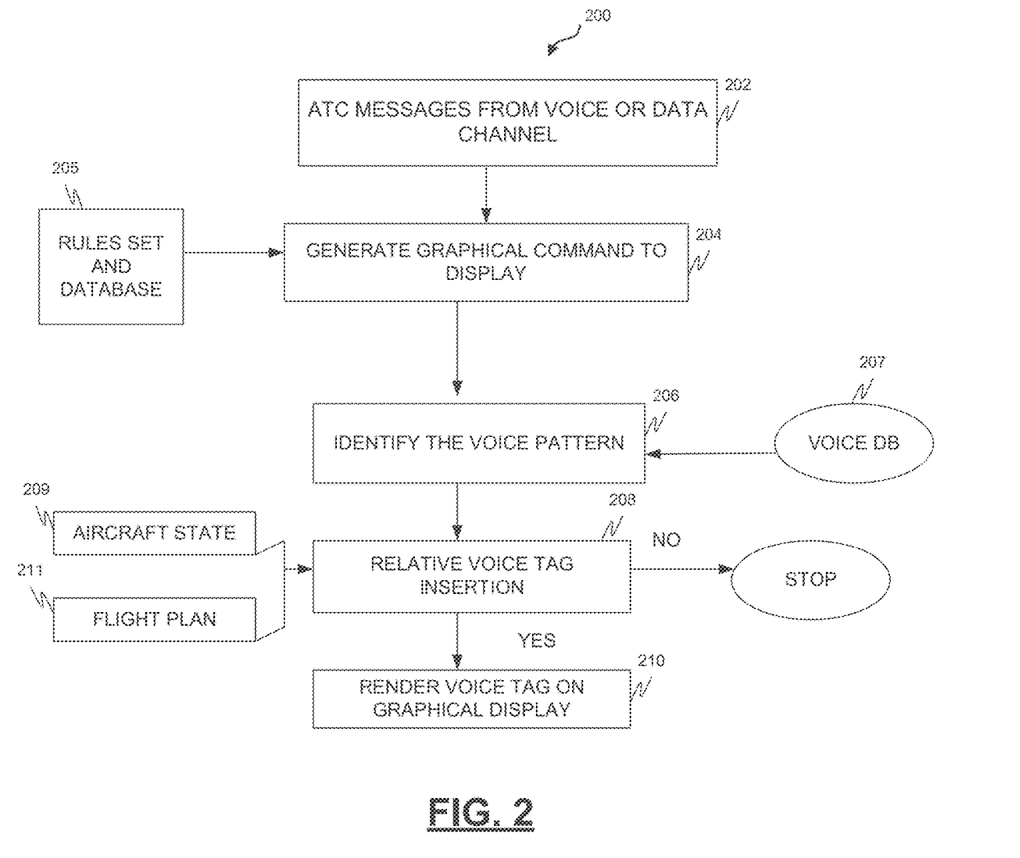
FIG. 2 is a process flow chart depicting an example process for producing active voice tags on a flight path displayed on a graphical display unit, in accordance with some embodiments.

FIG. 2 is a process flow chart depicting an example process 200 for producing active voice tags on a flight path displayed on a graphical display unit. The order of operation within the process 200 is not limited to the sequential execution as illustrated in the figure but may be performed in one or more varying orders as applicable and in accordance with the present disclosure The example process 200 includes receiving ATC messages from voice or data channels (operation 202) and generating a graphical command to display (operation 204). This can involve identifying one or more specific instructions from a received ATC message, wherein the identifying includes: separating the received message into one or more message segments; correlating, for each message segment, the message segment to an instruction type from a rules-set database 205; retrieving instruction parameters (e.g., instruction execution location and maneuver parameter such as heading change, altitude change, speed change, and others) from the message segment; and generating a specific instruction from the instruction type based on the instruction parameters retrieved from its correlated message segment.

The example process 200 includes identifying a voice pattern (operation 206). This can involve identifying a voice pattern from a voice database 207 that corresponds to the instruction.

The example process 200 includes relative voice tag insertion (operation 208). This can involve determining, for the specific instruction, based on aircraft state data 209 and aircraft flight plan data 211, a location relative to a planned flight path of the aircraft at which the specific instruction should be provided to flight crew; generating, for the specific instruction, a voice message configured to recite the specific instruction (e.g., including a fixed component and a relative component); and associating with the voice message an actuatable graphical element that is actuatable to cause the voice message to be provided to flight crew on the aircraft.

The example process 200 includes rendering the voice tag on the graphical display (operation 210). This can involve rendering the voice tag (e.g., the actuatable graphical element) at or near the determined location on a depiction of the planned flight path that is displayed on the graphical display unit and causing the voice message associated with the actuatable graphical element to be provided as an aural message responsive to actuation of the actuatable graphical element.

Figure 3:
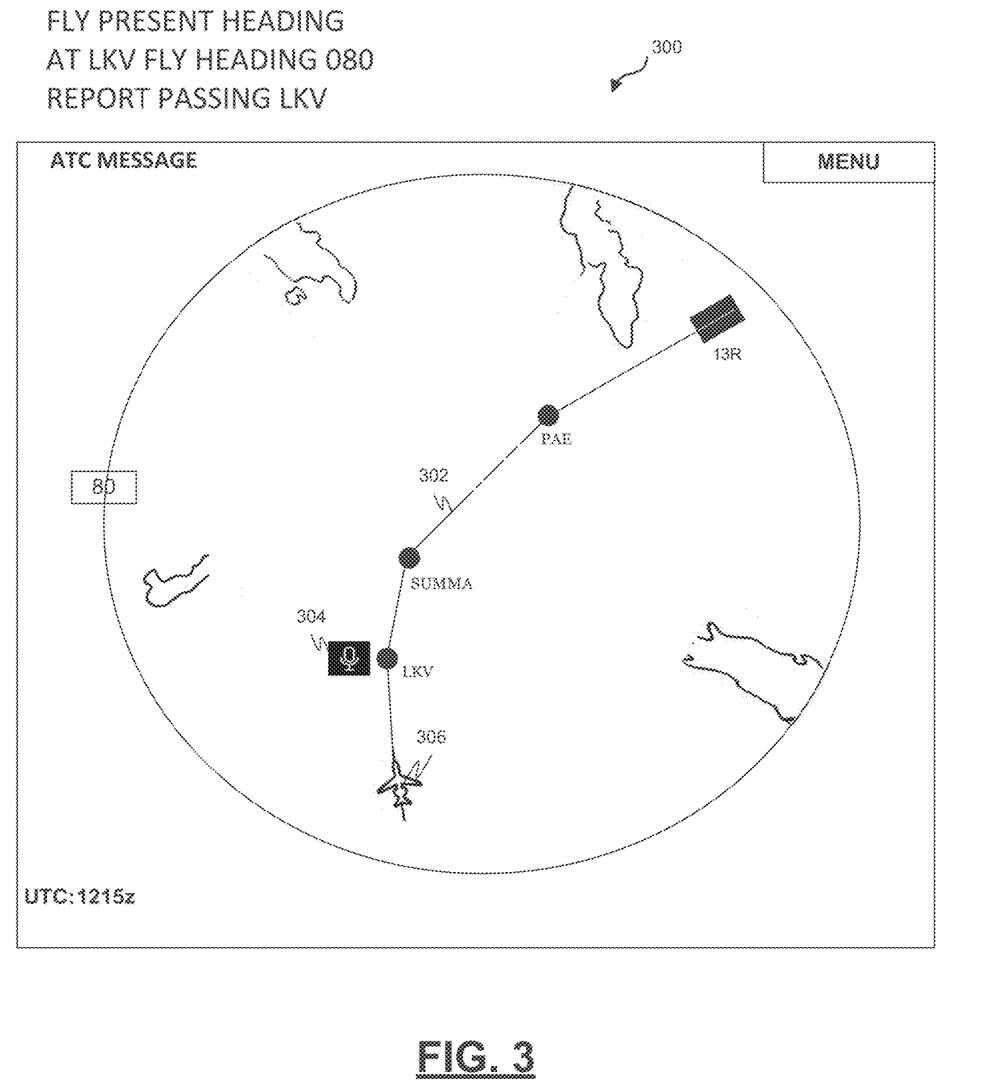
FIG. 3 is a diagram depicting an example operating scenario with an example graphical display of an active flight path with a voice tag rendered thereon, in accordance with some embodiments.

FIG. 3 is a diagram depicting an example operating scenario with an example graphical display 300 of an active flight path 302 with a voice tag graphical element 304 rendered thereon. In this example, an aircraft icon 306 representative of the ownship is depicted on the flight path 302 along with a plurality of waypoints (LKV, SUMMA, and PAE) before ending at a runway (13R). The aircraft will receive one or more ATC messages, each of which could be a single or concatenated message. In this example, the aircraft received the following ATC message: "FLY PRESENT HEADING. AT LKV FLY HEADING 080. REPORT PASSING LKV." In response, an example voice tag generation system generated a relative voice tag graphical element 304 and positioned the relative voice tag graphical element 304 adjacent to the LKV waypoint on the display of the active flight path 302. The example voice tag generation system also generates a voice message that is associated with the voice tag graphical element 304. The voice message includes a fixed component, the instruction to follow from the ATC message, and a relative component, when relative to the aircraft's current position should the maneuver be performed. Example voice messages the example voice tag generation system may produce include "REACHING LKV IN 15 MINS. AFTER 15 MINS FLY HEADING 080 AND REPORT PASSING LKV" or "12 NM TO REACH LKV. AFTER 12 NM FLY HEADING 080 AND REPORT PASSING LKV" or others. The relative component can be set when the relative voice tag graphical element 304 is actuated (e.g., via cursor selection or touch selection).

Figure 4:
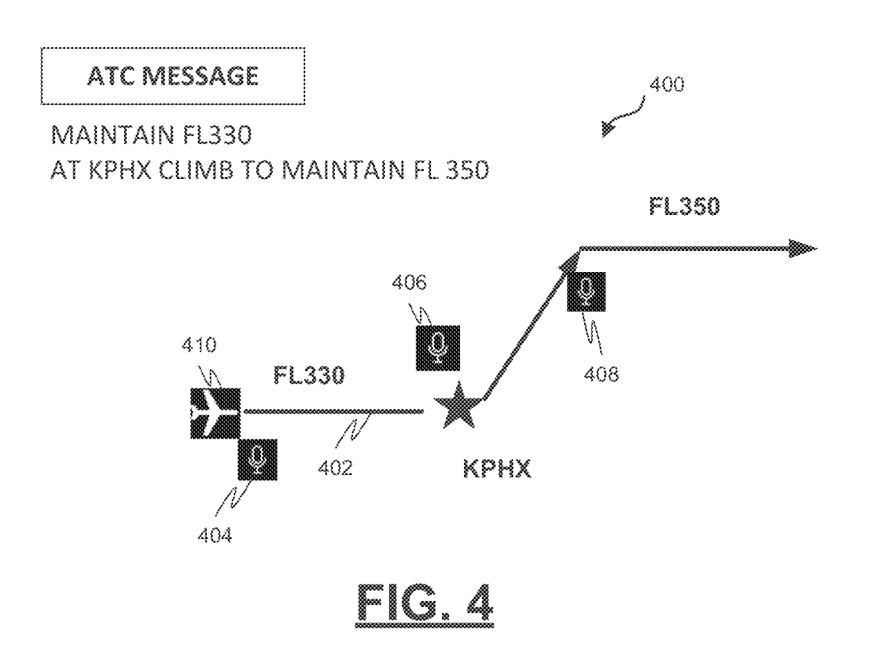
FIG. 4 is a diagram depicting an example operating scenario with an example graphical display of an active flight path with a plurality of voice tag graphical elements rendered thereon, in accordance with some embodiments.

FIG. 4 is a diagram depicting an example operating scenario with an example graphical display 400 of an active flight path 402 with a plurality of voice tag graphical elements 404, 406, 408 rendered thereon. In this example, an aircraft icon 410 representative of the ownship is depicted on the flight path 402 along with a waypoint (KPHX). The aircraft can receive one or more ATC messages, each of which could be a single or concatenated message. In this example, the aircraft received the following ATC message: "MAINTAIN FL 330. AT KPHX CLIMB TO MAINTAIN FL 350." In response, an example voice tag generation system generated the plurality of relative voice tag graphical elements 404, 406, 408 and positioned the relative voice tag graphical elements 404, 406, 408 at three locations on the active flight path 402. The example voice tag generation system also generated voice messages that are associated with the voice tag graphical element 404, 406, 408. The voice messages includes a fixed component, the instruction to follow from the ATC message, and/or a relative component, when relative to the aircraft's current position should the maneuver be performed. An example voice message the example voice tag generation system may produce for relative voice tag graphical element 404 includes "MAINTAIN ALT 330 FOR THE NEXT 15 MINS." An example voice message the example voice tag generation system may produce for relative voice tag graphical element 406 includes "REACHING KPHX IN 15 MINS." An example voice message the example voice tag generation system may produce for relative voice tag graphical element 408 includes "FLY ALT 330 TILL 12 NM AND CLIMB TO FL 350." The relative component can be set when the relative voice tag graphical element 404 is actuated (e.g., via cursor selection or touch selection).

Figure 5:
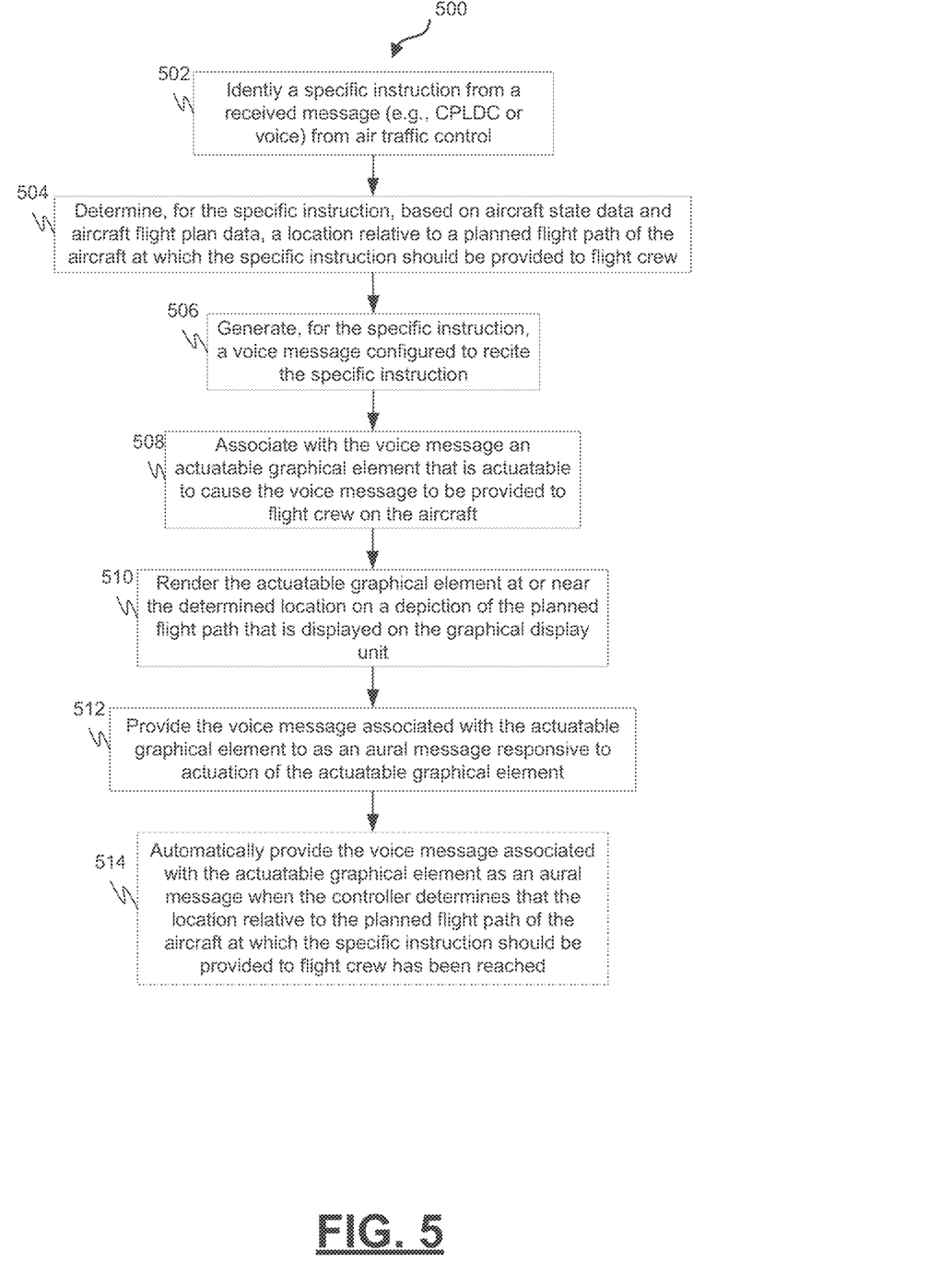
FIG. 5 is a process flow chart depicting an example process for producing active voice tags on a flight path displayed on a graphical display unit, in accordance with some embodiments.

FIG. 5 is a process flow chart depicting an example process 500 for producing active voice tags on a flight path displayed on a graphical display unit. The order of operation within the process 500 is not limited to the sequential execution as illustrated in the figure but may be performed in one or more varying orders as applicable and in accordance with the present disclosure.

The example process 500 includes identifying a specific instruction from a received message (e.g., CPDLC or voice) from air traffic control (ATC) (operation 502). Identifying the specific instruction from the received message from air traffic control may include separating the received message into one or more message segments; correlating, for each message segment, the message segment to an instruction type from a rules-set database and retrieve instruction parameters from the message segment; and modifying each instruction type to a specific instruction based on the instruction parameters (e.g., instruction execution location, maneuver parameter such as heading, altitude, speed) retrieved from its correlated message segment.

The example process 500 includes determining, for the specific instruction, based on aircraft state data and aircraft flight plan data, a location relative to a planned flight path of the aircraft at which the specific instruction should be provided to flight crew (operation 504). Determining the location relative to the planned flight path of the aircraft at which the specific instruction should be provided to flight crew may include: retrieving an instruction execution location from instruction parameters provided in the received message; and translating the instruction execution location to a location relative to the planned flight path of the aircraft.

The example process 500 includes generating, for the specific instruction, a voice message configured to recite the specific instruction (operation 506). Generating, for the specific instruction, the voice message configured to recite the specific instruction may include: identifying a voice pattern to use for reciting the specific instruction from a voice database; and translating the specific instruction into the voice message using the identified voice pattern.

The example process 500 includes associating with the voice message an actuatable graphical element that is actuatable to cause the voice message to be provided to flight crew on the aircraft (operation 508) and rendering the actuatable graphical element at or near the determined location on a depiction of the planned flight path that is displayed on the graphical display unit (operation 510). The generated voice message when actuated via the actuatable graphical element may be configured to recite, based on the determined location, a projected time, distance, or aircraft state in the future at which the specific instruction should be performed. Therefore, when actuated before the aircraft reaches the determined location the generated voice message includes how far (time or distance) before the maneuver is to be performed.

The example process 500 includes providing the voice message associated with the actuatable graphical element as an aural message responsive to actuation of the actuatable graphical element (operation 512). Providing the voice message associated with the actuatable graphical element may include: determining, based on aircraft state data and aircraft flight plan data, a projected time or distance in the future at which the specific instruction should be performed; modifying the voice message to include the projected time or distance in the future at which the specific instruction should be performed; and causing the modified voice message with the projected time or distance in the future at which the specific instruction should be performed to be provided as an aural message. In addition to providing an aural message, a textual message may also be provided on a graphic display device.

The example process 500 optionally includes automatically providing the voice message associated with the actuatable graphical element as an aural message upon reaching the location relative to the planned flight path of the aircraft at which the specific instruction should be provided to flight crew (operation 514).

Described herein are apparatus, systems, techniques and articles for providing relative voice tags corresponding to ATC messages received on an aerial vehicle. In one embodiment, a flight deck system on an aircraft for producing active voice tags on a flight path displayed on a graphical display unit is provided. The flight deck system comprises a controller configured to: identify a specific instruction from a received message (e.g., CPDLC or voice) from air traffic control (ATC); determine, for the specific instruction, based on aircraft state data and aircraft flight plan data, a location relative to a planned flight path of the aircraft at which the specific instruction should be provided to flight crew; generate, for the specific instruction, a voice message configured to recite the specific instruction; associate with the voice message an actuatable graphical element that is actuatable to cause the voice message to be provided to flight crew on the aircraft; render the actuatable graphical element at or near the determined location on a depiction of the planned flight path that is displayed on the graphical display unit; and cause the voice message associated with the actuatable graphical element to be provided as an aural message responsive to actuation of the actuatable graphical element.

These aspects and other embodiments may include one or more of the following features. The generated voice message may be further configured to recite, based on the determined location, a projected time, distance, or aircraft state in the future at which the specific instruction should be performed. To identify a specific instruction from a received message from air traffic control, the controller may be configured to: separate the received message into one or more message segments; correlate, for each message segment, the message segment to an instruction type from a rules-set database and retrieve instruction parameters from the message segment; and modify each instruction type to a specific instruction based on the instruction parameters (e.g., instruction execution location, maneuver parameter such as heading, altitude, speed) retrieved from its correlated message segment. To determine the location relative to the planned flight path of the aircraft at which the specific instruction should be provided to flight crew, the controller may be configured to: retrieve an instruction execution location from instruction parameters provided in the received message; and translate the instruction execution location to a location relative to the planned flight path of the aircraft. To generate, for the specific instruction, a voice message configured to recite the specific instruction, the controller may be configured to: identify a voice pattern to use for reciting the specific instruction from a voice database; and translate the specific instruction into the voice message using the identified voice pattern. To cause the voice message associated with the actuatable graphical element to be provided, the controller may be configured to: determine, based on aircraft state data and aircraft flight plan data, a projected time or distance in the future at which the specific instruction should be performed; modify the voice message to include the projected time or distance in the future at which the specific instruction should be performed; and cause the modified voice message with the projected time or distance in the future at which the specific instruction should be performed to be provided as an aural message. To cause the voice message associated with the actuatable graphical element to be provided, the controller may be further configured to cause the voice message to be provided as a textual message on a graphic display device. The controller may be further configured to cause the voice message associated with the actuatable graphical element to be automatically provided as an aural message when the controller determines that the location relative to the planned flight path of the aircraft at which the specific instruction should be provided to flight crew has been reached.

In another embodiment, a method on an aircraft for producing active voice tags on a flight path displayed on a graphical display unit is provided. The method comprises: identifying a specific instruction from a received message (e.g., CPDLC or voice) from air traffic control (ATC); determining, for the specific instruction, based on aircraft state data and aircraft flight plan data, a location relative to a planned flight path of the aircraft at which the specific instruction should be provided to flight crew; generating, for the specific instruction, a voice message configured to recite the specific instruction; associating with the voice message an actuatable graphical element that is actuatable to cause the voice message to be provided to flight crew on the aircraft; rendering the actuatable graphical element at or near the determined location on a depiction of the planned flight path that is displayed on the graphical display unit; and providing the voice message associated with the actuatable graphical element as an aural message responsive to actuation of the actuatable graphical element.

These aspects and other embodiments may include one or more of the following features. The generated voice message may be further configured to recite, based on the determined location, a projected time, distance, or aircraft state in the future at which the specific instruction should be performed. Identifying the specific instruction from the received message from air traffic control may comprise: separating the received message into one or more message segments; correlating, for each message segment, the message segment to an instruction type from a rules-set database and retrieve instruction parameters from the message segment; and modifying each instruction type to a specific instruction based on the instruction parameters (e.g., instruction execution location, maneuver parameter such as heading, altitude, speed) retrieved from its correlated message segment. Determining the location relative to the planned flight path of the aircraft at which the specific instruction should be provided to flight crew may comprise: retrieving an instruction execution location from instruction parameters provided in the received message; and translating the instruction execution location to a location relative to the planned flight path of the aircraft. Generating, for the specific instruction, the voice message configured to recite the specific instruction may comprise: identifying a voice pattern to use for reciting the specific instruction from a voice database; and translating the specific instruction into the voice message using the identified voice pattern. Providing the voice message associated with the actuatable graphical element may comprise: determining, based on aircraft state data and aircraft flight plan data, a projected time or distance in the future at which the specific instruction should be performed; modifying the voice message to include the projected time or distance in the future at which the specific instruction should be performed; and causing the modified voice message with the projected time or distance in the future at which the specific instruction should be performed to be provided as an aural message. Providing the voice message associated with the actuatable graphical element may further comprise providing the voice message as a textual message on a graphic display device. The method may further comprise automatically providing the voice message associated with the actuatable graphical element as an aural message upon reaching the location relative to the planned flight path of the aircraft at which the specific instruction should be provided to flight crew.

In another embodiment, a non-transitory computer-readable medium having stored thereon instructions that when executed by a processor cause the processor to perform a method for producing active voice tags on a flight path displayed on a graphical display unit is provided. The method comprises: identifying a specific instruction from a received message (e.g., CPDLC or voice) from air traffic control (ATC); determining, for the specific instruction, based on aircraft state data and aircraft flight plan data, a location relative to a planned flight path of the aircraft at which the specific instruction should be provided to flight crew; generating, for the specific instruction, a voice message configured to recite the specific instruction; associating with the voice message an actuatable graphical element that is actuatable to cause the voice message to be provided to flight crew on the aircraft; rendering the actuatable graphical element at or near the determined location on a depiction of the planned flight path that is displayed on the graphical display unit; and providing the voice message associated with the actuatable graphical element as an aural message responsive to actuation of the actuatable graphical element.

These aspects and other embodiments may include one or more of the following features. The generated voice message may be further configured to recite, based on the determined location, a projected time, distance, or aircraft state in the future at which the specific instruction should be performed. Identifying the specific instruction from the received message from air traffic control may comprise: separating the received message into one or more message segments; correlating, for each message segment, the message segment to an instruction type from a rules-set database and retrieve instruction parameters from the message segment; and modifying each instruction type to a specific instruction based on the instruction parameters (e.g., instruction execution location, maneuver parameter such as heading, altitude, speed) retrieved from its correlated message segment. Determining the location relative to the planned flight path of the aircraft at which the specific instruction should be provided to flight crew may comprise: retrieving an instruction execution location from instruction parameters provided in the received message; and translating the instruction execution location to a location relative to the planned flight path of the aircraft. Generating, for the specific instruction, the voice message configured to recite the specific instruction may comprise: identifying a voice pattern to use for reciting the specific instruction from a voice database; and translating the specific instruction into the voice message using the identified voice pattern. Providing the voice message associated with the actuatable graphical element may comprise: determining, based on aircraft state data and aircraft flight plan data, a projected time or distance in the future at which the specific instruction should be performed; modifying the voice message to include the projected time or distance in the future at which the specific instruction should be performed; and causing the modified voice message with the projected time or distance in the future at which the specific instruction should be performed to be provided as an aural message. Providing the voice message associated with the actuatable graphical element may further comprise providing the voice message as a textual message on a graphic display device. The method may further comprise automatically providing the voice message associated with the actuatable graphical element as an aural message upon reaching the location relative to the planned flight path of the aircraft at which the specific instruction should be provided to flight crew.

In another embodiment, a flight deck system for producing active voice tags on a flight path displayed on a graphical display unit is provided. The flight deck system comprises a controller configured to: identify an instruction from a received message (e.g., CPDLC or voice) from air traffic control (ATC); determine, for the specific instruction, based on aircraft state data and aircraft flight plan data, a location relative to a planned flight path of the aircraft at which the specific instruction should be provided to flight crew; generate, for the specific instruction, a voice message configured to recite the specific instruction, and configured to recite, based on the determined location, a projected time, distance, or aircraft state in the future at which the specific instruction should be performed; associate an actuatable graphical element with the voice message, the actuatable graphical element being actuatable to cause the voice message to be provided to flight crew on the aircraft; render the actuatable graphical element at or near the determined location on a display of the projected flight path that is displayed on the graphical display unit; and cause the voice message associated with the actuatable graphical element to be provided responsive to actuation of the actuatable graphical element.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. A software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system on an aircraft for producing a graphical display of an active flight path with one or more active voice tag graphical elements displayed on a graphical display unit, the flight deck system comprising a controller configured to:
   identify a specific instruction from a received message from air traffic control (ATC);
   predict, for the specific instruction, based on aircraft state data and aircraft flight plan data, a location during active flight relative to an active flight path of the aircraft at which the specific instruction should be provided to flight crew;
   generate, for the specific instruction, a voice message configured to recite the specific instruction;
   generate a graphical display window that includes a graphical depiction of at least a portion of the active flight path that includes a waypoint, and an aircraft icon representative of the aircraft that is positioned on the graphical depiction of the active flight path at a first location that is indicative of a position of the aircraft relative to the active flight path;
   generate a voice tag graphical element;
   associate the voice message with the voice tag graphical element, wherein the voice tag graphical element is actuatable to cause the voice message to be provided to flight crew on the aircraft;
   position the voice tag graphical element in the graphical display window at a second location that is indicative of the predicted location relative to the active flight path;
   cause the graphical display window including the graphical depiction of the active flight path, the waypoint, the aircraft icon, and the voice tag graphical element to be displayed on the graphical display unit; and
   cause the voice message associated with the voice tag graphical element to be provided as an aural message responsive to actuation of the voice tag graphical element.

2. The flight deck system of claim 1, wherein the generated voice message is further configured to recite, based on the predicted location, a projected time, distance, or aircraft state at a future instance at which the specific instruction should be performed.

3. The flight deck system of claim 1, wherein to identify the specific instruction from the received message from air traffic control the controller is configured to:
   separate the received message into one or more message segments;
   for each message segment of the one or more message segments, correlate the message segment to an instruction type from a rules-set database and retrieve instruction parameters from the message segment; and
   modify each instruction type to a specific instruction based on the instruction parameters retrieved from its correlated message segment.

4. The flight deck system of claim 1, wherein to determine the location relative to the active flight path of the aircraft at which the specific instruction should be provided to flight crew the controller is configured to:
   retrieve an instruction execution location from instruction parameters provided in the received message; and
   translate the instruction execution location to a location relative to the active flight path of the aircraft.

5. The flight deck system of claim 1, wherein to generate, for the specific instruction, the voice message configured to recite the specific instruction the controller is configured to:
   identify a voice pattern to use for reciting the specific instruction from a voice database; and
   translate the specific instruction into the voice message using the identified voice pattern.

6. The flight deck system of claim 1, wherein to cause the voice message associated with the voice tag graphical element to be provided the controller is configured to:
   determine, based on aircraft state data and aircraft flight plan data, a projected time or distance at a future instance at which the specific instruction should be performed;
   modify the voice message to include the projected time or distance at the future instance at which the specific instruction should be performed; and
   cause the modified voice message with the projected time or distance at the future instance at which the specific instruction should be performed to be provided as an aural message.

7. The flight deck system of claim 1, wherein to cause the voice message associated with the voice tag graphical element to be provided the controller is further configured to cause the voice message to be provided as a textual message on a graphic display device.

8. The flight deck system of claim 1, wherein the controller is further configured to cause the voice message associated with the voice tag graphical element to be automatically provided as an aural message when the controller determines that the location relative to the active flight path of the aircraft at which the specific instruction should be provided to flight crew has been reached.

9. A method on an aircraft for producing a graphical display of an active flight path with one or more active voice tag graphical elements displayed on a graphical display unit, the method comprising:
   identifying a specific instruction from a received message from air traffic control (ATC);
   predicting, for the specific instruction, based on aircraft state data and aircraft flight plan data, a location during active flight relative to an active flight path of the aircraft at which the specific instruction should be provided to flight crew;
   generating, for the specific instruction, a voice message configured to recite the specific instruction;
   generating a graphical display window that includes a graphical depiction of at least a portion of the active flight path that includes a waypoint, and an aircraft icon representative of the aircraft that is positioned on the graphical depiction of the active flight path at a first location that is indicative of a position of the aircraft relative to the active flight path;
   generating a voice tag graphical element;
   associating the voice message with the voice tag graphical element, wherein the voice tag graphical element is actuatable to cause the voice message to be provided to flight crew on the aircraft;

positioning the voice tag graphical element in the graphical display window at a second location that is indicative of the predicted location relative to the active flight path;

causing the graphical display window including the graphical depiction of the active flight path, the waypoint, the aircraft icon, and the voice tag graphical element to be displayed on the graphical display unit; and providing the voice message associated with the voice tag graphical element as an aural message responsive to actuation of the voice tag graphical element.

10. The method of claim 9, wherein the generated voice message is further configured to recite, based on the predicted location, a projected time, distance, or aircraft state at a future instance at which the specific instruction should be performed.

11. The method of claim 9, wherein identifying the specific instruction from the received message from air traffic control comprises:

separating the received message into one or more message segments;

correlating, for each message segment of the one or more message segments, the message segment to an instruction type from a rules-set database and retrieve instruction parameters from the message segment; and modifying each instruction type to a specific instruction based on the instruction parameters retrieved from its correlated message segment.

12. The method of claim 9, wherein determining the location relative to the active flight path of the aircraft at which the specific instruction should be provided to flight crew comprises:

retrieving an instruction execution location from instruction parameters provided in the received message; and translating the instruction execution location to a location relative to the active flight path of the aircraft.

13. The method of claim 9, wherein generating, for the specific instruction, the voice message configured to recite the specific instruction comprises:

identifying a voice pattern to use for reciting the specific instruction from a voice database; and translating the specific instruction into the voice message using the identified voice pattern.

14. The method of claim 9, wherein providing the voice message associated with the voice tag graphical element comprises:

determining, based on aircraft state data and aircraft flight plan data, a projected time or distance at a future instance at which the specific instruction should be performed;

modifying the voice message to include the projected time or distance at the future instance at which the specific instruction should be performed; and causing the modified voice message with the projected time or distance at the future instance at which the specific instruction should be performed to be provided as an aural message.

15. The method of claim 9, wherein providing the voice message associated with the voice tag graphical element further comprises providing the voice message as a textual message on a graphic display device.

16. The method of claim 9, further comprising automatically providing the voice message associated with the voice tag graphical element as an aural message upon reaching the location relative to the active flight path of the aircraft at which the specific instruction should be provided to flight crew.

17. A non-transitory computer-readable medium having stored thereon instructions that when executed by a processor cause the processor to perform a method for producing a graphical display of an active flight path with one or more active voice tag graphical elements displayed on a graphical display unit, the method comprising:

identifying on an aircraft a specific instruction from a received message from air traffic control (ATC);

predicting, for the specific instruction, based on aircraft state data and aircraft flight plan data, a location during active flight relative to the active flight path of the aircraft at which the specific instruction should be provided to flight crew;

generating, for the specific instruction, a voice message configured to recite the specific instruction;

generating a graphical display window that includes a graphical depiction of at least a portion of the active flight path that includes a waypoint, and an aircraft icon representative of the aircraft that is positioned on the graphical depiction of the active flight path at a first location that is indicative of a position of the aircraft relative to the active flight path;

generating a voice tag graphical element;

associating the voice message with the voice tag graphical element, wherein the voice tag graphical element is actuatable to cause the voice message to be provided to flight crew on the aircraft;

positioning the voice tag graphical element in the graphical display window at a second location that is indicative of the predicted location relative to the active flight path;

causing the graphical display window including the graphical depiction of the active flight path, the waypoint, the aircraft icon, and the voice tag graphical element to be displayed on the graphical display unit; and providing the voice message associated with the voice tag graphical element as an aural message responsive to actuation of the voice tag graphical element.

18. The non-transitory computer-readable medium of claim 17, wherein the generated voice message is further configured to recite, based on the predicted location, a projected time, distance, or aircraft state at a future instance at which the specific instruction should be performed.

19. The non-transitory computer-readable medium of claim 17, wherein providing the voice message associated with the voice tag graphical element comprises:

determining, based on aircraft state data and aircraft flight plan data, a projected time or distance at a future instance at which the specific instruction should be performed;

modifying the voice message to include the projected time or distance at the future instance at which the specific instruction should be performed; and causing the modified voice message with the projected time or distance at the future instance at which the specific instruction should be performed to be provided as an aural message.

20. The non-transitory computer-readable medium of claim 17, wherein identifying the specific instruction from the received message from air traffic control comprises:

separating the received message into one or more message segments;

correlating, for each message segment of the one or more message segments, the message segment to an instruction type from a rules-set database and retrieve instruction parameters from the message segment; and modifying each instruction type to a specific instruction based on the instruction parameters retrieved from its correlated message segment.

* * * * *